United States Patent [19]

Reitberger et al.

[11] Patent Number: 5,428,833
[45] Date of Patent: Jun. 27, 1995

[54] ARRANGEMENT FOR SUPPRESSING SPURIOUS SIGNALS OCCURRING IN THE RECEPTION SIGNAL OF A RECEIVER OF A HIGH-FREQUENCY MESSAGE TRANSMISSION SYSTEM

[75] Inventors: Peter Reitberger, Munich; Thomas Rieder, Muehldorf/Inn, both of Germany

[73] Assignee: Rohde & Schwartz GmbH & Co., KG, Munich, Germany

[21] Appl. No.: 6,475
[22] Filed: Jan. 21, 1993
[30] Foreign Application Priority Data Jan. 22, 1992 [DE] Germany .................. 42 01 542.1

[51] Int. Cl.⁶ .............................................. H04B 1/10
[52] U.S. Cl. ..................................... 455/304; 455/306
[58] Field of Search ............... 455/303, 304, 311, 312, 455/308, 304, 296, 295, 63, 67.3, 305, 306

[56] References Cited

U.S. PATENT DOCUMENTS

| | | | |
|---|---|---|---|
| 3,876,943 | 4/1975 | Watt et al. | 455/304 |
| 4,723,303 | 2/1988 | Koch | 455/303 |
| 5,075,697 | 12/1991 | Koizumi et al. | 455/296 |
| 5,263,191 | 11/1993 | Dickerson | 455/304 |
| 5,307,517 | 4/1994 | Rich | 455/306 |

FOREIGN PATENT DOCUMENTS 0315990 5/1989 European Pat. Off. ........... 455/63

OTHER PUBLICATIONS

"Use of Interference Cancellers in Order to Increase Spectrum Usage" Recommendations & Reports of the CCIR, vol. 1, Spectrum Utilization & Monitoring, Dubrovnik, 1986, pp. 63-79, particularly FIG. 3.

Primary Examiner—Edward F. Urban
Assistant Examiner—Mary M. Lin
Attorney, Agent, or Firm—Hill, Steadman & Simpson

[57] ABSTRACT

In an arrangement for suppressing spurious signals occurring in a reception signal in a receiver of a high-frequency message transmission system, these spurious signals resulting from at least one neighboring channel that neighbors the useful signal channel, the reception signal is distributed onto at least two branches. One of the branches has a summing element as well as a circuit for generating a signal with a frequency, phase and amplitude corresponding to the useful signal. The other branch also has a summing element as well as a circuit for generating a signal having a frequency, phase and amplitude corresponding to the spurious signal. The signals of these branches are respectively supplied antiphase to the summing element of the respective other branch. In addition, an evaluation and control circuit is allocated to the branches, the momentary frequency, phase and amplitude of the useful or spurious signal allocated to the respective branch being measured and evaluated therewith and with which the frequency, phase and amplitude of the signal generated in the respective branch is correspondingly set dependent on these measured and evaluation values.

25 Claims, 2 Drawing Sheets

FIG. 1A
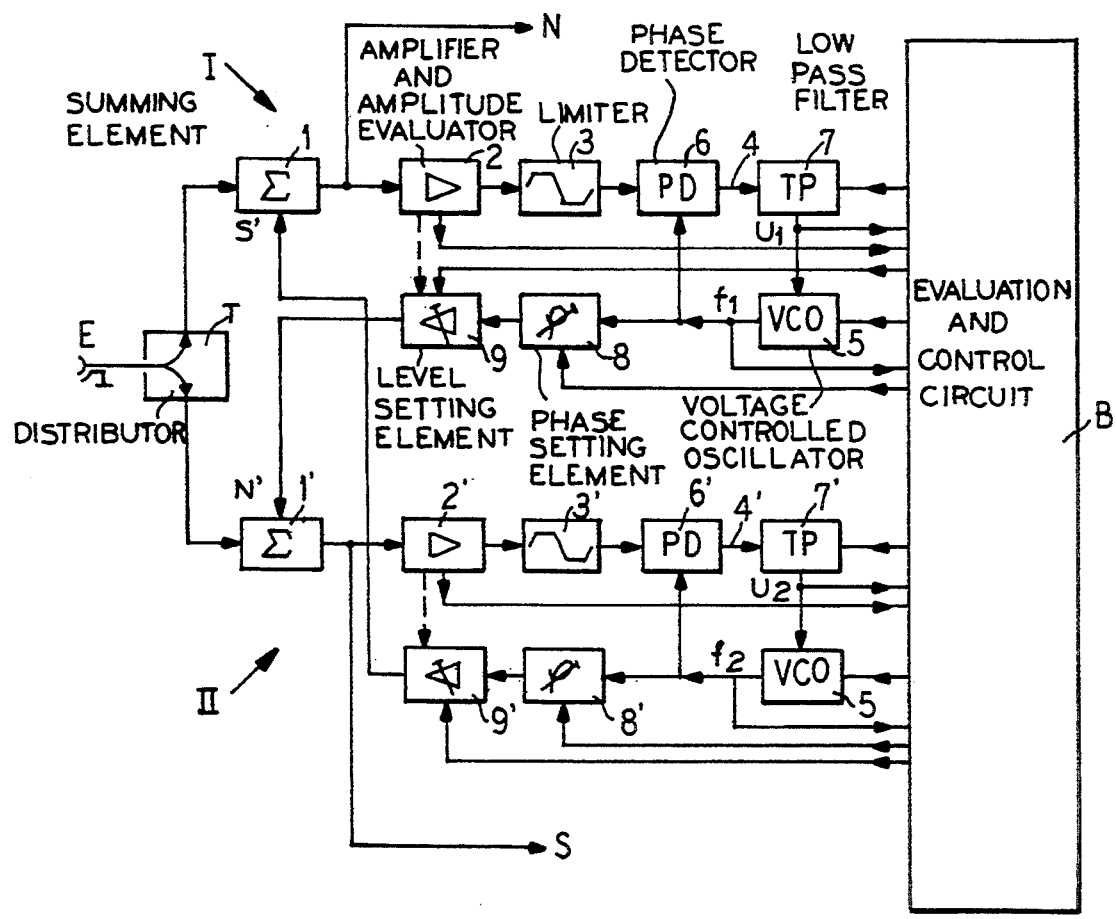
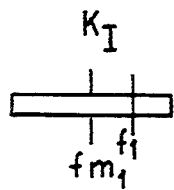
FIG. 1B
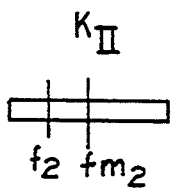
FIG. 1C
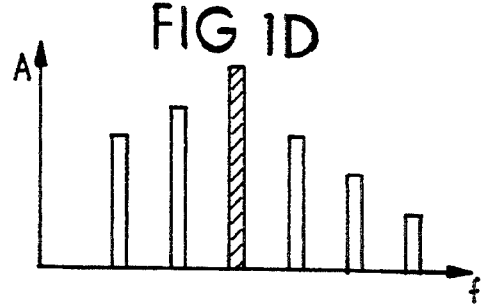
FIG 1D

ARRANGEMENT FOR SUPPRESSING SPURIOUS SIGNALS OCCURRING IN THE RECEPTION SIGNAL OF A RECEIVER OF A HIGH-FREQUENCY MESSAGE TRANSMISSION SYSTEM

BACKGROUND OF THE INVENTION

The present invention is directed to an arrangement for suppressing spurious signals in a reception signal of a receiver in a high-frequency transmission system. The spurious signals come from a neighboring channel to a useful signal channel.

An arrangement of this type for suppressing spurious signals in a reception channel is known (Recommendations and Reports CCIR, Vol. I "Spectrum Utilization and Monitoring", Dubrovnik, 1986, pages 63–79, particularly FIG. 3). The local generation of compensation signals having the frequency and phase of the useful signal or of the spurious signal is achieved with a phase control loop having a voltage-controlled oscillator. The setting of the amplitude of these signals occurs by means of level-setting elements that are arranged between an output of the voltage-controlled oscillator and a summing element of another branch. Both the setting of the frequency of the oscillators of the phase control loops to the frequency of the useful signal or spurious signal, as well as, the setting of the level-setting elements to the respective amplitude of the signals occurs manually in the known arrangement and remains unaltered during operation. The known arrangement is, thus, only suitable for receivers wherein the reception frequency of the useful signal and the frequency of the spurious signals is precisely known in advance and does not change during operation.

SUMMARY OF THE INVENTION

It is an object of the present invention to provide an arrangement of the above-described type wherein the settings of frequency and amplitude occur automatically.

In general terms one embodiment of the present invention is an arrangement for suppressing spurious signals occurring in a reception signal of a receiver in a high-frequency message transmission system, the spurious signals resulting from at least one neighboring channel neighboring a useful signal channel. The reception signal is divided into two branches, one branch of the two branches having a summing element and a signal generating circuit means for generating a first signal having a frequency corresponding to the useful signal and the other branch of the two branches having a summing element and a signal generating circuit means for generating a second signal having a frequency corresponding to the spurious signal. The first and second signals of the two branches are respectively supplied anti-phase to the summing element of the respectively other branch. The two branches are connected to an evaluation and control circuit with which a momentary frequency of the useful signal allocated to the one branch and the momentary frequency of the spurious signal allocated to the other branch is measured. The frequency of the respective one of the first and second signals generated in the respective branch is set dependent on the measured value.

Another embodiment of the present invention is an arrangement wherein the reception signal is divided into two branches, one branch of the two branches having a summing element and a signal generating circuit means for generating a first signal having an amplitude corresponding to the useful signal and the other branch of the two branches having a summing element and a signal generating circuit means for generating a second signal having an amplitude corresponding to the spurious signal. The first and second signals of the two branches are respectively supplied anti-phase to the summing element of the respectively other branch. Each branch of the two branches has additional amplitude measuring means for measuring the amplitude of the useful or spurious signal, respectively, and the amplitude of the respective first or second signal generated in a respective branch of the two branches is automatically set dependent on values of the measured amplitude.

Yet another embodiment of the present invention is an arrangement wherein the reception signal is divided into two branches, one branch of the two branches having a summing element and a signal generating circuit means for generating a first signal having a frequency and an amplitude corresponding to the useful signal and the other branch of the two branches having a summing element and a signal generating circuit means for generating a second signal having a frequency and an amplitude corresponding to the spurious signal. The first and second signals of the two branches are respectively supplied anti-phase to the summing element of the respectively other branch. The two branches are connected to an evaluation and control circuit with which a momentary frequency of the useful signal allocated to the one branch and a momentary frequency of the spurious signal allocated to the other branch is measured. Each branch of the two branches has an additional amplitude means for measuring the amplitude of the useful or spurious signal, respectively, and the frequency and amplitude of the respective first or second signal generated in a respective branch of the two branches is automatically set by the evaluation and control circuit and the respective amplitude measuring means.

In the arrangement of the present invention, the setting of the frequency, phase and amplitude of the compensation signals locally generated in the branches occur automatically and are dependent on a measurement and evaluation of respective momentary quantities, such as momentary frequency, momentary phase and momentary amplitude of the reception signals, so that potential changes in the frequency position of these reception signals are automatically compensated even during operation. The locally generated compensation signals that correspond to the spurious signal also more precisely generated with respect to frequency, phase and amplitude. A suppression of spurious signals occurring in a reception signal that is improved by orders of magnitude is possible when compared to a known arrangement having permanently set frequency and amplitude. Useful signals that are practically completely free of potential spurious signals of a neighboring channel are processed in a useful signal channel and are subsequently further-evaluated.

The arrangement of the present invention is thus particularly suited for mobile radio receivers wherein FM signals are received in a narrow channel configuration of, for example, only 12 kHz. When, for example, the transmission frequency fluctuates slightly in such mobile radio systems or when a modulation index of the frequency modulation is greater than allowed, the spurious signal in the arrangement of the present invention is automatically locally generated with this frequency position deviating from the norm. Thus, an optimum suppression of spurious signals is achieved in the neighboring useful signal channel, even though this spurious signal of the neighboring channel fluctuates in frequency or in terms of its modulation index since the locally generated compensation signal is exactly reconstructed with the actual spurious signal frequency and with the actual spurious signal modulation index with the arrangement of the present invention.

By measuring various parameters of momentarily received signals, a criterion of a separate type for an optimally exact suppression of spurious signals can be respectively found for arbitrary types of modulation, i.e. not only for frequency modulation or amplitude modulation but also for phase-modulated or FSK-modulated signals. Given frequency-modulated signals, not only can the center frequency, to which the local oscillator is set, be exactly calculated from the accumulation of the momentary frequencies, but it is also possible to identify which channels of a transmission system are occupied or which channels are not occupied, which branches of the arrangement of the present invention are to be allocated to a specific channel, how great the modulation bandwidth (modulation index) is or how great the disturbing influence is on the actual useful signal. All of this can be identified on the basis of a time analysis of respective momentary frequencies. As a supplement to the time analysis of the momentary frequencies, an amplitude classification of the momentary frequencies can be implemented in the same manner on the basis of a corresponding time analysis of the amplitude values. Together with the counting and storing of the momentary frequencies, for example, the respective amplitude of these momentary frequencies can be also measured and stored at the same time, so that the modulation signal for the compensation can be also identified in a simple manner for an amplitude-modulated reception signal. For example, the evaluation can also occur in the evaluation and control circuit such that specific momentary frequencies are only measured and stored when the amplitude thereof lies above a preselectable threshold.

Dependent on the type of modulation employed, it is adequate in some instance to measure only the frequency or only the amplitude of the useful signal or spurious signal and to generate this as a compensation signal. In most instances, however, it is expedient for good compensation to measure both the frequency and the amplitude and, insofar as possible, the phase of the useful signal or spurious signal as well and to correspondingly set the frequency, amplitude and phase of the compensation signal generated in the respective branch.

In the simplest case, the circuit for generating the compensation signals is a synthesizer whose frequency, phase and amplitude can be electronically set. Advantageously, however, a known phase control loop having a voltage-controlled oscillator is used for this purpose, because this results in an especially simple way for measuring the frequency and phase.

The arrangement of the present invention is not only suited for the suppression of spurious signals in a reception signal of the receiver of a message transmission system (wherein, thus, the useful signal freed of the spurious signal is subsequently evaluated in a message receiver), but is also suited in the same way for the suppression of spurious signals in a signal for which specific quantities should be measured free of spurious signals. It is thus directly suitable as a selective measuring means, for example measuring the voltage, current, power, frequency, phase or the like at a useful signal freed of neighboring spurious signals. It is also suitable for measuring corresponding measured quantities of spurious signals selected from the reception signal or for measuring quantities between these two signals that are respectively free from a disturbing neighboring signal.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1A is a block diagram of an arrangement of the present invention having two branches;

FIG. 1B depicts relevant frequencies in one channel of the system;

FIG. 1C depicts relevant frequencies in a neighboring channel of the system;

FIG. 1D depicts the amplitudes of the relevant frequencies resulting from cross-talk between the two channels.

DESCRIPTION OF THE PREFERRED EMBODIMENT

Figure 2:
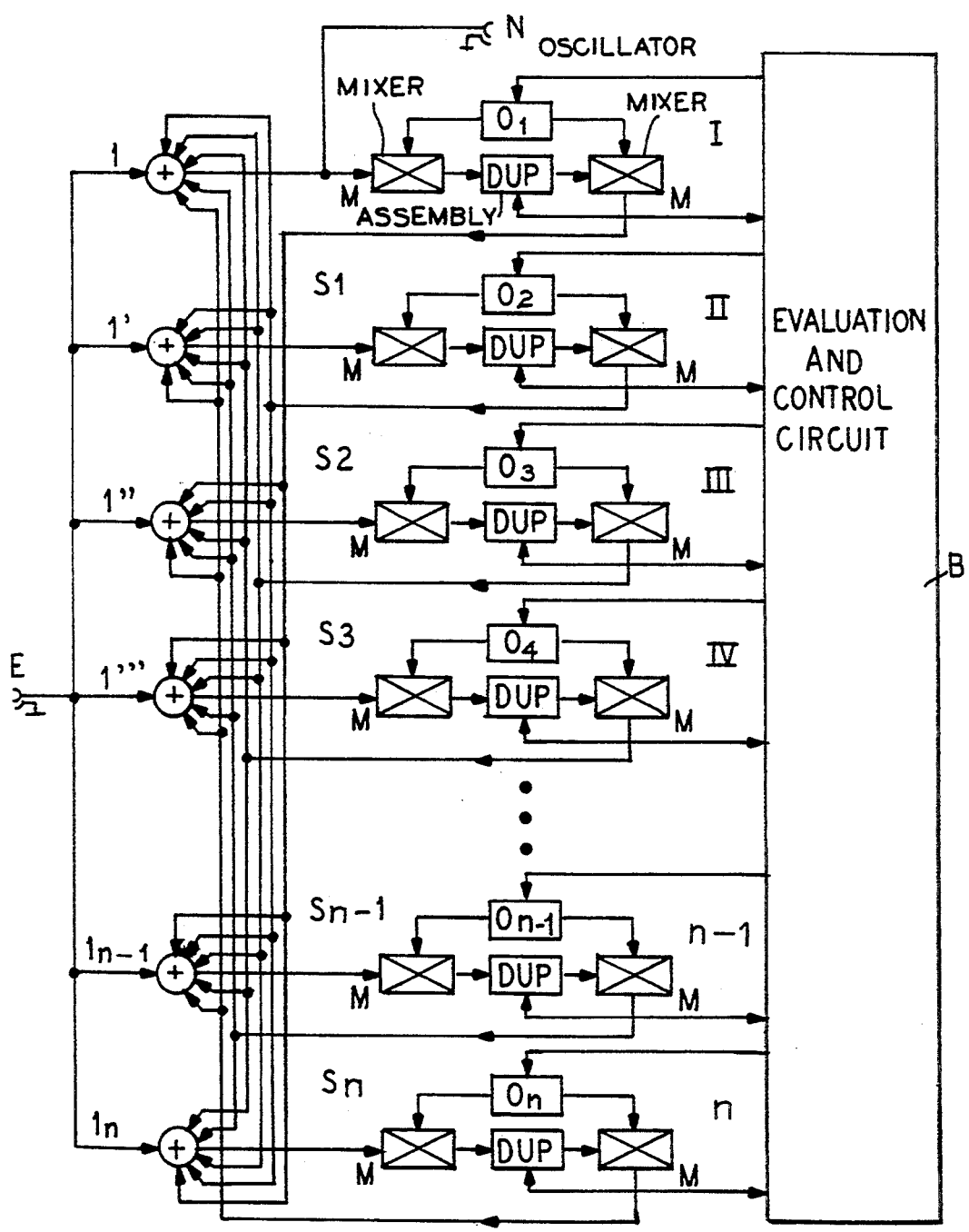
FIG. 2 is a block diagram of an arrangement of the present invention having three or more branches.

FIG. 1 is a block circuit diagram of an arrangement for suppressing spurious signals S occurring in a reception signal E, the arrangement having only two parallel branches, i.e. for generating a useful signal N that is free of these spurious signals S and that is subsequently evaluated, for example, in a standard channel receiver as a message signal. In the illustrated exemplary embodiment, the suppression of the spurious signals occurs at a high-frequency or radio-frequency level, even though the principle of the present invention, of course, can also be employed at an intermediate frequency level or even at a low-frequency level (for example, given linear modulation methods). The high-frequency reception signal E is divided onto two parallel branches I and II via a distributor T. The upper branch I is composed of a summing element 1, a following amplifier and amplitude evaluator 2, a limiter 3 and a phase control loop 4 having a voltage-controlled oscillator 5, a phase detector 6 and a low-pass filter 7. The output frequency of the voltage-controlled oscillator 5 is supplied to a level-setting element 9 via a phase-setting element 8. The lower branch II is constructed in the same way; the corresponding assemblies are respectively referenced 1' through 9'. The output of the level-setting element 9 is connected to the summing element 1' of the branch II and the output of the level-setting element 9' of the branch II is connected to the summing element 1 of the other branch I. The two branches I and II also have an evaluation and control circuit B allocated to them that is connected by means of interactive connections to the individual assemblies of the branches I and II and with which are measured and evaluated, first, the momentary frequency, phase and amplitude and, as needed, other quantities of the signals N and S that are processed in the two branches I and II. As shall be set forth in greater detail below, the individual assemblies of the branches I, II are set by means of the interactive connections dependent on this measurement and evaluation such that a respectively optimum suppression of the spurious signals S occurs in the reception signal resulting in useful signals N that are free of spurious signals S.

In the exemplary embodiment of FIG. 1, the input signal E is a frequency-modulated signal of a high-frequency message transmission system composed of only two channels. One channel $K_I$, for example is defined by its center frequency $f_{m1}$ and, for example, has a bandwidth of 12 kHz, as is standard in mobile radio systems. Let the neighboring channel $K_{II}$ be defined by its center frequency $f_{m2}$. The frequency positions $f_{m1}$ and $f_{m2}$ of the two neighboring channels $K_I$, $K_{II}$ are input as prior information into the evaluation and control circuit B, the oscillator 5 is roughly set therewith to a frequency lying in the channel $K_I$ and the oscillator 5' is roughly set therewith to a frequency lying in the channel $K_{II}$. The capture range of the two oscillators 5 and 5' is also selected such that it can be respectively regulated in frequency within the channel width of, for example, 12 kAz. Due to cross-talk, the reception signal E is composed of a mix of these two frequency modulation signals $f_1$ and $f_2$. However, only the useful signal N of the channel $K_I$ that is disturbed by the spurious signal S of the neighboring channel $K_{II}$ should be evaluated. Via the evaluation and control circuit B, the frequency $f_1$ of the useful signal N is identified, namely, either directly on the basis of an evaluation of the output frequency $f_1$ of the oscillator 5 or on the basis of an evaluation of the control voltage $U_1$ at the output of the low-pass filter 7 of the phase control loop 4 that is proportional to this frequency $f_1$. All momentary frequency values $f_1$ that fluctuate as a consequence of the frequency modulation within the channel $K_I$ are measured in the circuit B in a predetermined time interval. The current center frequency of the useful signal N of the channel $K_I$ is calculated from the occurrences of these momentary frequencies. This current center frequency need not coincide with the standardized center frequency $f_{m1}$ of the channel as can, for example, be the case as a consequence of instability of the transmission frequency or due to unintentional fluctuations of the modulation parameters.

The current center frequency of the useful signal N is thus exactly identified in this way in the evaluation circuit B. The oscillator 5 is preset to this center frequency $f_1$, so that a compensation signal corresponding to the useful signal N is supplied to the summing element 1' of the second branch II exactly with the momentary frequency, i.e, the oscillator 5 operates in an optimum capture range. In the same way, the output frequency $f_2$ of the oscillator 5' of the second branch II is generated exactly with the carrier frequency with the spurious signal S, again by prior measurement of the current center frequency and corresponding presetting of the oscillator 5'. The locally generated compensation signals N' or S' supplied to the two summing elements 1, 1' are respectively shifted in phase by 180° compared to the signal parts N or, S in the uncompensated input signal E. This is achieved by an approximately 90° phase shifter 8, 8' since a phase shift of approximately 90° is already produced by the phase control loop 4.

At the same time, however, a corresponding, automatic setting of the amplitude of these compensation signals N', S' is also additionally undertaken by the respective level-setting elements 9, or 9'. To that end, for example, the momentary amplitude of the momentary frequencies respectively measured in the time window is measured and stored in the evaluation and control circuit B and the level-setting element 9, 9' is correspondingly set dependent thereon. In the simplest case, this can also occur directly by controlling the level-setting element via the appertaining amplitude evaluation circuit 2, as is indicated with broken lines by the direct interactive connection between the assemblies 2 and 9. What is achieved in this way is that large amplitude fluctuations in the frequency-modulated reception signal E (as particularly occur in mobile radio systems) are exactly taken into consideration when the generating the compensation signals N', S'.

Other assemblies of the branches I and II can be correspondingly controlled dependent on the measured quantities of the respective momentary signals evaluated in the evaluation and control circuit B. Thus, for example, the low-pass filter 7, 7' of the phase control loop 4, 4' can be controlled in terms of its bandwidth dependent on the application. Given frequency modulation, the bandwidth of the low-pass filter 7, 7' is selected relatively broad, so that the phase control loop can quickly follow the frequency modulation. In exchange, however, the bandwidth of the level-setting element 9, 9' is selected, for example, relatively narrow, since, of course, no high-frequency amplitude changes need be leveled here. Conversely, the bandwidth for the low-pass filter 7, 7' is selected relatively narrow for the compensation of amplitude-modulated signals since, of course, only slight fluctuations in carrier frequency occur here. In exchange, the bandwidth for the level-setting element 9, 9' is selected relatively large since, of course, the amplitude changes caused by the amplitude modulation must be followed-up quickly in this case. In a similar way, for example, the phase-setting elements 8, 8' could also be set dependent on the measurement parameters. This can occur on the basis of a corresponding evaluation of the output signals of the summing elements 1, 1' in a circuit B, so that an exact anti-phase feed of the compensation signals S, N' is always guaranteed. Whether, for example, amplitude modulation or frequency modulation or some other known type of modulation is involved can also be automatically recognized from the various measured quantities in the circuit B, so that this information can also be correspondingly taken into consideration in the subsequent generation of the local compensation signals N', S'.

The arrangement of the present invention is not only suited for two branches I and II according to FIG. 1, but, in a development of the present invention, it is also suitable for three or more branches, as shown in FIG. 2. In this example, n branches I through n are connected in parallel. They are respectively supplied in parallel with an input signal E via a corresponding plurality of summing elements 1, 1' through $1_n$. These individual branches I, II, III through n can be set to various useful signals or spurious signals via a common evaluation and control circuit B in the same manner as set forth in conjunction with FIG. 1. In a mobile radio system that operates in a frequency range between 410 and 430 MHz having 1600 channels each having a respective width of 12 kHz, it is then only necessary to correspondingly pre-set the appertaining oscillator for, for example, the useful channel 1230 via the evaluation and control circuit B that again contains the frequency position of the individual channels as prior information and to define this as a useful channel and to simultaneously correspondingly pre-set the oscillator of the channel 1229 lying therebelow and of the channel 1231 lying thereabove and to define these as spurious channels and to thus generate the compensation signals N' and S'. In this way, for example, it is possible to filter out a useful signal N from a highly disturbed input signal E, this useful signal N not only having suppressed a spurious signal S1 that is transmitted in a channel lying above the useful signal channel, but also having suppressed, for example, a spurious signal S2 that is transmitted in a channel lying below the useful signal channel. In the same way, even further spurious signals S3 through $S_m$ can be eliminated from the reception signal E, these being transmitted in other, more remote channels. The only thing required for this purpose is that the individual branches are set to the respective frequency via the measurement and control with the evaluation and control circuit B. It is also possible that two or more of this plurality of branches are set to the same channel and are then tuned to different spurious signals in this common channel.

FIG. 2 also shows an especially simple structure for the individual branches. The individual assemblies DUP for the simulation of the signals are identical and are each composed of the assemblies 2-9 of FIG. 1, i.e., they respectively operate in the same range of oscillator frequencies. The different frequency position is defined via the circuit B on the basis of an oscillator, $O_1$ through $O_n$, allocated to every branch that collaborates with two identical mixers M respectively preceding and following the assembly DUP. With reference to the exemplary embodiment of FIG. 1, for example, this means that the oscillator $O_1$ defines the frequency position of the useful signal N for the upper branch I and the oscillator $O_2$ defines the frequency position for the spurious signal S, whereas the two oscillators 5 and 5' each respectively operate at a preferably lower, identical frequency. Thus, an especially simple and inexpensive overall structure results.

In some instances it is sufficient to only generate the spurious signal S' with respect to frequency and/or amplitude as well as phase and to thus only compensate the useful signal N' corresponding to the useful signal N. In general, however, it is meaningful to generate the corresponding compensation signals N' and S' both from the useful signal and from the spurious signal, since a compensated spurious signal S is thus also generated and from which the appertaining compensation signal S' can then be derived in a simpler and more precise way.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for suppressing spurious signals occurring in a reception signal of a receiver in a high-frequency message transmission system, the spurious signals resulting from at least one neighboring channel neighboring a useful signal channel, comprising:

the reception signal having a useful signal and a spurious signal;

the reception signal being divided into two branches, one branch of said two branches having a summing element and a signal generating circuit means for generating a first signal having a frequency corresponding to the useful signal and the other branch of said two branches having a summing element and a signal generating circuit means for generating a second signal having a frequency corresponding to the spurious signal;

first phase shifting means for shifting a phase of the first signal by 180°, said first phase shifting means having an output connected to said summing element of said other branch;

second phase shifting means for shifting a phase of the second signal by 180°, said second phase shifting means having an output connected to said summing element of said one branch;

said two branches connected to an evaluation and control circuit for measuring a momentary frequency of the useful signal allocated to the one branch and a momentary frequency of the spurious signal allocated to the other branch; and the frequency of the respective one of the first and second signals generated in the respective branch being set dependent on said measured value.

2. The arrangement according to claim 1, wherein occurrences of an appearance of momentary frequencies in the two branches is defined in the evaluation and control circuit and, dependent thereon, the frequency of the respective first or second signal corresponding to the useful or spurious signal, respectively, is set in the signal generating circuit means of the corresponding branch.

3. The arrangement according to claim 1, wherein a momentary phase of the measured, momentary frequency is also additionally measured by the evaluation and control circuit and a phase of the respective first or second signal generated in the respective branch is also set dependent on values of said measured phase.

4. The arrangement according to claim 1, wherein the evaluation with measured quantities and the control derived therefrom is in at least one of a high-frequency range, an intermediate frequency range, and a low frequency range.

5. The arrangement according to claim 1, wherein said arrangement is a measuring means for measuring arbitrary electrical measured quantities of one of useful signals and spurious signals in which unwanted signals have been suppressed.

6. An arrangement for suppressing spurious signals occurring in a reception signal of a receiver in a high-frequency message transmission system, the spurious signals resulting from at least one neighboring channel neighboring a useful signal channel, comprising:

the reception signal having a useful signal and a spurious signal;

the reception signal being divided into two branches, one branch of said two branches having a summing element and a signal generating circuit means for generating a first signal having an amplitude corresponding to the useful signal and the other branch of said two branches having a summing element and a signal generating circuit means for generating a second signal having an amplitude corresponding to the spurious signal;

first phase shifting means for shifting a phase of the first signal by 180°, said first phase shifting means having an output connected to said summing element of said other branch;

second phase shifting means for shifting a phase of the second signal by 180°, said second phase shifting means having an output connected to said summing element of said one branch;

each branch of said two branches having additional amplitude measuring means for measuring the amplitude of the useful or spurious signal, respectively, and the amplitude of the respective first or second signal generated in a respective branch of the two branches being automatically set dependent on values of said measured amplitude.

7. The arrangement according to claim 6, wherein a respective level setting element is arranged between the signal generating circuit means for generating a signal of one branch and the summing element of the other branch, said level setting element being automatically set by means of the amplitude measuring means.

8. The arrangement according to claim 7, wherein a setting speed of the level setting elements is set dependent on the measured values evaluated in the evaluation and control circuit.

9. The arrangement according to claim 7, wherein the amplitude measuring means is an amplitude evaluation circuit arranged in a respective branch by means of which the level setting elements are directly controlled.

10. The arrangement according to claim 7, wherein the measurement and evaluation of the amplitude of the useful or spurious signal occurs in the evaluation and control circuit and wherein the level setting elements are controlled by means of said measurement and evaluation of the amplitude.

11. The arrangement according to claim 6, wherein the evaluation with measured quantities and the control derived therefrom is in at least one of a high-frequency range, an intermediate frequency range, and a low frequency range.

12. The arrangement according to claim 6, wherein said arrangement is a measuring means for measuring arbitrary electrical measured quantities of one of useful signals and spurious signals in which unwanted signals have been suppressed.

13. An arrangement for suppressing spurious signals occurring in a reception signal of a receiver in a high-frequency message transmission system, the spurious signals resulting from at least one neighboring channel neighboring a useful signal channel, comprising:

the reception signal having a useful signal and a spurious signal;

the reception signal being divided into two branches, one branch of said two branches having a summing element and a signal generating circuit means for generating a first signal having a frequency and an amplitude corresponding to the useful signal and the other branch of said two branches having a summing element and a signal generating circuit means for generating a second signal having a frequency and an amplitude corresponding to the spurious signal;

first phase shifting means for shifting a phase of the first signal by 180°, said first phase shifting means having an output connected to said summing element of said other branch;

second phase shifting means for shifting a phase of the second signal by 180°, said second phase shifting means having an output connected to said summing element of said one branch;

said two branches connected to an evaluation and control circuit for measuring a momentary frequency of the useful signal allocated to one branch and a momentary frequency of the spurious signal allocated to the other branch;

each branch of said two branches having additional amplitude means for measuring the amplitude of the useful or spurious signal, respectively, and the frequency and amplitude of the respective first or second signal generated in a respective branch of said two branches being automatically set by said evaluation and control circuit and the respective amplitude measuring means.

14. The arrangement according to claim 13, wherein occurrences of an appearance of momentary frequencies in the two branches is defined in the evaluation and control circuit and, dependent thereon, the frequency of the respective first or second signal corresponding to the useful or spurious signal, respectively, is set in the signal generating circuit means of the corresponding branch.

15. The arrangement according to claim 13, wherein a momentary phase of the measured, momentary frequency is measured by the evaluation and control circuit and a phase of the respective first or second signal generated in the respective branch is set dependent on values of said measured phase.

16. The arrangement according to claim 15, wherein the signal generating circuit means for generating the respective first or second signal having a frequency corresponding to the useful or spurious signal, respectively, is formed by a phase control loop having a voltage-controlled oscillator, and wherein the measurement of the frequency and phase of the respective useful or spurious signal allocated to the respective branch occurs by measuring one of an output frequency and a control voltage of the voltage-controlled oscillator.

17. The arrangement according to claim 16, wherein the phase control loop has a low pass filter and wherein a bandwidth of the low pass filter of the phase control loop is controlled by the evaluation and control circuit dependent on values of the measured frequency and phase.

18. The arrangement according to claim 16, wherein the voltage-controlled oscillator is set by means of the evaluation and control circuit to a frequency value identified by evaluation of a distribution of occurrences of the momentary frequencies.

19. The arrangement according to claim 16, wherein the signal generating circuit means, an amplitude evaluation circuit and a level and phase setting element respectively form a basic circuit that is identical in all branches, respective mixers being arranged preceding and following said basic circuit and a heterodyne oscillator being allocated to said mixers, said heterodyne oscillator being settable to a mixed frequency corresponding to a respectively desired branch frequency by the evaluation and control circuit.

20. The arrangement according to claim 13, wherein a respective level setting element is arranged between the signal generating circuit means for generating a signal of one branch and the summing element of the other branch, said level setting element being automatically set by means of the amplitude measuring means.

21. The arrangement according to claim 20, wherein a setting speed of the level setting elements is set dependent on the measured values evaluated in the evaluation and control circuit.

22. The arrangement according to claim 20, wherein the amplitude measuring means is an amplitude evaluation circuit arranged in a respective branch by means of which the level setting elements are directly controlled.

23. The arrangement according to claim 20, wherein the measurement and evaluation of the amplitude of the useful or spurious signal occurs in the evaluation and control circuit and wherein the level setting elements are controlled by means of said measurement and evaluation of the amplitude.

24. The arrangement according to claim 13, wherein the evaluation with measured quantities and the control derived therefrom is in at least one of a high-frequency range, an intermediate frequency range, and a low frequency range.

25. The arrangement according to claim 13, wherein said arrangement is a measuring means for measuring arbitrary electrical measured quantities of one of useful signals and spurious signals in which unwanted signals have been suppressed.

* * * * *